United States Patent [19]

Tsubouchi

[11] Patent Number: 5,853,764
[45] Date of Patent: Dec. 29, 1998

[54] PROCESS FOR PREPARING FINE POWDER OF SILK FIBROIN

[75] Inventor: Kozo Tsubouchi, Ibaraki-ken, Japan

[73] Assignee: National Institute of Sericultural and Entomological Science, Ministry of Agriculture, Forestry and Fisheries, Director General, Japan

[21] Appl. No.: 702,451

[22] PCT Filed: Jan. 26, 1996

[86] PCT No.: PCT/JP96/00154

§ 371 Date: Sep. 26, 1996

§ 102(e) Date: Sep. 26, 1996

[87] PCT Pub. No.: WO96/23020

PCT Pub. Date: Aug. 1, 1996

[30] Foreign Application Priority Data

Jan. 27, 1995 [JP] Japan .................................. 7-031417

[51] Int. Cl.$^6$ .......................... A61K 7/021; A61K 7/035; A61K 9/50; D06M 11/00
[52] U.S. Cl. .............................. 424/499; 424/63; 424/69; 8/128.1
[58] Field of Search ........................... 260/123.7; 424/63, 424/69, 499; 8/128.1

[56] References Cited

U.S. PATENT DOCUMENTS 4,233,211 11/1980 Ohtomo ................................ 260/123.7
4,233,212 11/1980 Otoi ..................................... 260/123.7

FOREIGN PATENT DOCUMENTS 58-45232 3/1983 Japan .
4300369 10/1992 Japan .
4337331 11/1992 Japan .

*Primary Examiner*—George C. Elliott
*Assistant Examiner*—Sean M'Garry
*Attorney, Agent, or Firm*—Lorusso & Loud

[57] ABSTRACT

A process is provided for preparing crystalline fine powder of silk fibroin from a silk substance in an industrially advantageous fashion.

The process for the preparation of fine powder of the silk fibroin is such that, after the silk substance is brought into an alkaline aqueous solution at a temperature of 95° C. or higher in order to cause a strength of said silk substance to deteriorate, the resulting silk substance is subjected to treatment with alkali and dried, and the dry silk substance is pulverized into finely divided powder.

10 Claims, No Drawings

PROCESS FOR PREPARING FINE POWDER OF SILK FIBROIN

TECHNICAL FIELD

The present invention relates to a process for preparing fine powder of silk fibroin from a silk substance.

BACKGROUND ART

Fine powder of silk fibroin is useful as an additive to food products, beverages and cosmetic products.

Heretofore, as a process for preparing fine powder of silk fibroin, it is known a process comprising dissolving a silk substance in an aqueous solution containing a neutral salt, removing the neutral salt from the solution to yield an aqueous fibroin solution, adding a precipitating agent to the resulting aqueous solution to cause the silk fibroin to precipitate therein, and separating the precipitate from the solution and drying the precipitate or lyophilizing the aqueous solution, thereby yielding fine powder of silk fibroin.

This process, however, cannot be said to be satisfactory from the point of view of industrial application because it requires the silk substance to be dissolved in water forming an aqueous solution.

On the other hand, a silk substance cannot be pulverized into finely divided crystalline powder with high efficiency by mechanically dividing the silk substance directly into fine powder because the silk substance is so high in mechanical strength that it is very hard to divide it into fine powder.

It is an object of the present invention to provide a process for preparing fine powder of crystalline silk fibroin from a silk substance, which can offer industrial advantages.

DISCLOSURE OF INVENTION

As a result of extensive studies and research to achieve the object as described hereinabove, the present inventors have completed this invention.

The present invention provides a process for the preparation of fine powder of silk fibroin, characterized in that a silk substance is contacted with an alkaline aqueous solution at a temperature of 95° C. or higher to deteriorate the strength of said silk substance, that the resulting silk substance is then subjected dealkalinization and drying, and that the resulting dried silk substance is thereafter finely pulverized.

The silk substance to be used for the present invention may include, for example, cocoons, cocoon thread, silk yarn, silk cloth and waste.

The process according to the present invention may be preferably carried out first by treating a silk substance by bringing it into contact with an alkaline aqueous solution at a temperature of 95° C. or higher, preferably approximately 100° C. As an alkaline substance for the alkaline aqueous solution, there may be employed sodium carbonate, potassium carbonate, sodium hydroxide, potassium hydroxide or the like. The extent of alkalinity of the alkaline aqueous solution may be pH 11.5 or higher, preferably pH 12 or higher.

The treatment of the silk substance with the alkaline aqueous solution may be carried out by immersing the silk substance in the alkaline aqueous solution.

The period of time (treatment time) during which the silk substance is kept in contact with the alkaline aqueous solution is a period of time long enough to cause a strength of the silk substance, whichever threads produced by seri-culture or wild silkworms, to deteriorate to such a suitable extent to which the silk substance can be pulverized into finely divided powder. For silk threads, for example, it is such that they may come in contact with the alkaline aqueous solution until their tensile strength becomes approximately 0.05 g/d or less. Generally, the treatment time may be in the range of from 1 to 4 hours; however, additional 2 or 3 hours or longer hours are required when the raw silk thread is large in fineness or when attachment of siren can be recognized thereon or when a silk substance such as wild silk thread is difficult to deteriorate. The specific period of time required for allowing the silk substance to come in contact with the alkaline aqueous solution, however, can be determined readily by a simple preliminary experiment for investigating the relationship between the readiness of pulverizing the silk substance with its strength deteriorated after the alkali treatment and the period of time during which the silk substance comes in contact with the alkaline aqueous solution.

The silk substance treated with the alkaline aqueous solution is then subjected to, after separation from the alkaline aqueous solution, by washing out the alkaline substance attached thereto with water and removing it, followed by drying it.

Then, the silk substance is pulverized into finely divided powder in a manner as will be described hereinafter. Although the pulverization of the silk substance into finely divided powder can be conducted by a general pulverization technique, it is preferred to divide it into fine powder by a two-step process in which the first step comprises dividing the silk substance into coarse powder and the second step comprises dividing it into fine powder. The pulverization of the silk substance into coarsely divided powder may be effected so as to yield coarsely divided powder having an average particle size ranging from approximately 15 to 30 microns, and the pulverization thereof into finely divided powder may preferably be effected so as to yield finely divided powder having an average particle size ranging from approximately 3 to 6 microns.

When the silk substance is to be treated with the alkaline aqueous solution in accordance with the process of the present invention, it is preferred that the silk substance is placed in a bag made of a cloth material having a fine gap reticulated structure and it is treated by immersing the bag in an alkaline aqueous solution. In the like treatment, components dissolved from the silk substance into the alkaline aqueous solution upon treatment therewith and very small silk particles can be removed readily from the bag toward the outside by allowing them to pass through the fine gaps of the cloth material forming the bag. More specifically, the components of the silk substance and the fine silk substances can be removed from the bag to the outside through the fine gaps of the cloth material forming the bag, for example, by shaking the bag in the alkaline aqueous solution at plural times up and down or in right-and left directions, by dipping the bag into the alkaline aqueous solution and then pulling it above the solution, or the like.

As the cloth material constituting the bag, there may be used a woven or non-woven cloth made of alkali-resist fibers. As the alkali-resist fibers, there may be mentioned cotton fibers, synthetic resin fibers and so on. The dimension of the fine gaps may appropriately be determined in accordance with the dimension of the silk substance to be removed and it may generally be set to be small enough to allow only the fine silk substances having the size of 1 micron or smaller to pass wherethrough in the alkaline aqueous solution.

The treatment of the silk substances in the bag in the manner as described can offer the advantage that the silk substances can be washed with water after treatment while they are kept filled in the bag. By subjecting the silk substances to treatment with the alkaline aqueous solution and to the treatment after the treatment using the bag, it further offers the advantage that the silk substances treated can be collected with high efficiency.

The present invention can provide a highly efficient and industrially advantageous production of fine powder of silk fibroin from the silk substances. The fine powder of silk fibroin to be produced by the present invention is in a crystalline state and it has properties as high as silk thread has and is superior in, moisture diffusion property and moisture permeability.

The method according to the present invention is simple in treatment operation because it does not require a step for dissolving the silk substances thoroughly. Further, the fine powder of silk fibroin produced by the present invention is superior in crystalline properties and as high in quality as silk thread because non-crystalline portions of the silk substances are removed upon treatment with the alkaline aqueous solution. Therefore, the method according to the present invention is superior as a process for preparing crystalline fine powder of silk fibroin on an industrial scale.

EXAMPLES

The present invention will be described in more detail by way of examples.

Example 1

Using raw silk yarn having approximately 30 d (deniers) as a sample, 1 part by weight of the raw silk yarn was immersed in an alkaline aqueous solution consisting of 1 part by weight of sodium carbonate and 30 parts by weight of water and then boiled. In this treatment, the sample raw silk yarn lost its weight as time went by and the weight of the silk yarn reduced by approximately 10% by the treatment for 40 minutes and by approximately 16% by the treatment for 1 hour.

Further, in the previous treatment, the tensile strength of the raw silk yarn deteriorated as time went by and it reduced to approximately 0.04 g/d by the treatment for 1 hour.

The tensile strength of the raw silk yarn in this case was measured with a measurement instrument "Tensilon Model UTM-II".

The raw silk yarn treated in the manner as described hereinabove was then washed with water and subjected to dewatering four times in order to remove alkali, followed by drying at room temperature.

Then, the dried silk yarn was pulverized into coarsely divided powder having an average particle size of approximately 20 microns and then into finely divided powder. In this case, the pulverization into coarsely divided powder was conducted with a usual mill ("Sample Mill", manufactured by Fuji Denki Kogyo K. K.) and the pulverization into finely divided powder was conducted with a fine mill ("Current Jet", manufactured by Nisshin Engineering Co., Ltd.)

It was observed that particle sizes of the fine powder of the raw silk yarn pulverized in the manner as described hereinabove (fine powder of silk fibroin) were distributed in the range of from 1 to 20 microns and their average particle size was approximately 5 microns.

The fine powder of the silk fibroin was then measured by a polarization microscope and it was found to have a birefringence in the range of from $4.0 \times 10^{-3}$ to $5.0 \times 10^{-3}$. This birefringence is substantially equal to that of silk yarn fibroin having a birefringence of $5.2 \times 10^{-3}$. Therefore, it can be thought that the orientation of fibroin molecules in finely powdery form is equal to that of the silk yarn fibroin. Further, this is supported by a X-ray diffraction photograph of the fine powder of the silk fibroin and it was found to show a beta (b) type that was equal to that of silk yarn.

Furthermore, as a result of the thermal observation of the finely divided powder of the silk fibroin by a DSC instrument, no exothermic peak caused to otherwise appear due to crystallization was recognized in the DSC curve for the fine powder of the silk fibroin and it was thus confirmed that the fine powder had a crystallinity as high as silk yarn fibroin. In addition, it was found from the hygroscopic and moisture diffusion curves that the fine powder of the silk fibroin had a moisture content lower by about 1% than silk yarn and it was confirmed that it had substantially the same hygroscopic and moisture diffusion properties as high as the silk yarn has.

From the foregoing description, the fine powder of the silk fibroin according to the present invention was confirmed that it had the same configuration and functions as the silk yarn has.

As described hereinabove, the fine powder of the silk fibroin was produced from raw silk yarn at a yield rate of approximately 70% by the treatment with alkali for about 1 hour.

Example 2

The procedures of Example 1 were followed in substantially the same manner with the exception that raw silk yarn was filled in a bag and subjected to treatment with alkali and washing with water. As the bag, there was employed a bag made from cotton cloth woven by warp and weft, each having yarn number count 50, at a warp density of 25 threads per cm and a weft density of 20 threads per cm in a thickness of 0.25 cm and a weight of 120 grams per meter. By using this bag, substances dissolved during the alkali treatment and superfine powder having approximately 1 micron or smaller were removed through the cotton cloth into the bag.

In this example, the raw silk yarn used as a raw material provided fine powder of silk fibroin at a yield rate as high as 70% to 60% by the alkali treatment for about 2 to 3 hours.

Example 3

The procedures of Example 1 were followed in substantially the same manner with the exception that silk cloth was employed in place of the raw silk yarn. This example provided fine powder of silk fibroin at a yield rate as high as 75% by the alkali treatment for 1 hour.

I claim:
1. A process for the preparation of a fine powder of silk fibroin, comprising:
   contacting a silk substance containing crystalline fibroin with an alkaline aqueous solution at a temperature of 95° C. or higher, while maintaining the crystallinity of the silk fibroin in the silk substance, to reduce the tensile strength of said silk substance;
   dealkalinizing the resulting silk substance;
   drying the dealkalinized silk substance; and
   finely pulverizing the resulting dried silk substance to form the fine powder of silk fibroin having a crystallinity as high as the crystallinity of the fibroin in the silk substance used in said contacting and having an average particle size in the range of 3–6 $\mu$m.

2. A process as claimed in claim 1, wherein said contacting of said silk substance with said alkaline aqueous solution is carried out by placing said silk substance in a bag made of a cloth-like material having reticulate fine gaps and immersing said silk substance-containing bag in said alkaline aqueous solution to separate silk particles of a size smaller than said fine gaps and components dissolved from silk substance from the silk fibroin powder.

3. A process as claimed in claim 2, wherein said fine gaps have a size of 1 $\mu$m or less.

4. A process as claimed in claim 1, wherein said pulverization of said dried silk substance is carried out by first coarsely grinding said dried silk substance into an average particle size ranging from 15 to 30 $\mu$m, followed by fine grinding into an average particle size ranging from 3 to 6 $\mu$m.

5. A process as claimed in claim 2, wherein said pulverization of said dried silk substance is carried out by first coarsely grinding said dried silk substance into an average particle size ranging from 15 to 30 $\mu$m, followed by fine grinding into an average particle size ranging from 3 to 6 $\mu$m.

6. A process as claimed in claim 3, wherein said pulverization of said dried silk substance is carried out by first coarsely grinding said dried silk substance into an average particle size ranging from 15 to 30 $\mu$m, followed by fine grinding into an average particle size ranging from 3 to 6 $\mu$m.

7. A process as claimed in claim 1 wherein said alkaline aqueous solution is an aqueous solution of an alkali metal compound and has a pH of at least 11.5.

8. A process as claimed in claim 7 wherein said alkaline aqueous solution has a pH of at least 12.0.

9. A process as claimed in claim 1 wherein said alkaline aqueous solution has a pH of at least 11.5.

10. A process as claimed in claim 1 wherein said alkaline aqueous solution has a pH of at least 12.0.

* * * * *

UNITED STATES PATENT AND TRADEMARK OFFICE
CERTIFICATE OF CORRECTION

PATENT NO. : 5,853,764
DATED : December 29, 1998
INVENTOR(S) : Kozo Tsubouchi

It is certified that error appears in the above-identified patent and that said Letters Patent is hereby corrected as shown below:

Delete title page and substitute the attached title page.

Delete specification cols. 1-10 and substitute therefore the specification cols. 1-12 as shown on the attached ages.

Signed and Sealed this

Seventh Day of September, 2004

JON W. DUDAS
*Director of the United States Patent and Trademark Office*

United States Patent [19]

Tsubouchi

[11] Patent Number: 5,853,764

[45] Date of Patent: Dec. 29, 1998

[54] PROCESS FOR PREPARING FINE POWDER OF SILK FIBROIN

[75] Inventor: Kozo Tsubouchi, Ibaraki-ken, Japan

[73] Assignee: National Institute of Sericultural and Entomological Science, Ministry of Agriculture, Forestry and Fisheries, Director General, Japan

[21] Appl. No.: 08/702,451

[22] PCT Filed: Jan. 26, 1996

[86] PCT No.: PCT/JP96/00154

§ 371 Date: Sep. 26, 1996

§ 102(e) Date: Sep. 26, 1996

[87] PCT Pub. No.: WO96/23020

PCT Pub. Date: Aug. 1, 1996

[30] Foreign Application Priority Data

Jan. 27, 1995 [JP] Japan ................................. 7-031417

[51] Int. Cl.⁶ ...................... A61K 7/021; A61K 7/035; A61K 9/50; D06M 11/00

[52] U.S. Cl. .......................... 424/499; 424/63; 424/69; 8/128.1

[58] Field of Search ...................... 260/123.7; 424/63, 424/69, 499; 8/128.1

[56] References Cited

U.S. PATENT DOCUMENTS

| | | | |
|---|---|---|---|
| 4,233,211 | 11/1980 | Ohtomo | 260/123.7 |
| 4,233,212 | 11/1980 | Otoi | 260/123.7 |

FOREIGN PATENT DOCUMENTS

| | | |
|---|---|---|
| 5845232 | 3/1983 | Japan . |
| 4300369 | 10/1992 | Japan |
| 4337331 | 11/1992 | Japan |

Primary Examiner—George C. Elliott
Assistant Examiner—Sean McGarry
Attorney, Agent, or Firm—Lorusso & Loud

[57] ABSTRACT

A process is provided for preparing a crystalline fine powder of silk fibroin from a silk substance in an advantageous fashion. The process for the preparation of fine powder of the silk fibroin includes heating the silk substance in an alkaline aqueous solution at a temperature of 95° C. or higher in order to reduce the strength of the silk substance, the resulting silk substance is then washed and dried, and the dry silk substance is pulverized into a finely divided powder.

10 Claims, No Drawings

PROCESS FOR PREPARING FINE POWDER OF SILK FIBROIN

TECHNICAL FIELD

The present invention relates to a process for preparing fine powder of silk fibroin from a silk substance.

BACKGROUND ART

Fine powder of silk fibroin is useful as an additive to food products, beverages and cosmetic products.

One known process for preparing fine powder of silk fibroin includes dissolving a silk substance in an aqueous solution containing a neutral salt, removing the neutral salt from the solution to yield an aqueous fibroin solution, adding a precipitating agent to the resulting aqueous solution to cause the silk fibroin to precipitate therein, and separating the precipitate from the solution and drying the precipitate or lyophilizing the aqueous solution, thereby obtaining a fine powder of silk fibroin.

This process, however, cannot be said to be satisfactory from the point of view of industrial application because it requires the silk substance to be dissolved in water to form an aqueous solution.

On the other hand, a silk substance cannot be pulverized into a finely divided crystalline powder with high efficiency by mechanically dividing the silk substance directly into fine powder because the silk substance is so high in mechanical strength that it is very hard to divide it into fine powder.

It is an object of the present invention to provide a process for preparing a fine powder of crystalline silk fibroin from a silk substance, which process offers certain industrial advantages.

DISCLOSURE OF INVENTION

The present invention provides a process for the preparation of a fine powder of silk fibroin wherein a silk substance is contacted with an alkaline aqueous solution at a temperature of 95° C. or higher to reduce the strength of said silk substance. The resulting silk substance is then subjected dealkalinization and drying, and the resulting dried silk substance is thereafter finely pulverized.

The silk substance to be used for the present invention may include, for example, cocoons, cocoon thread, silk yarn, silk cloth and waste therefrom.

The process according to the present invention is preferably carried out by first treating a silk substance by bringing it into contact with an alkaline aqueous solution at a temperature of 95° C. or higher, preferably approximately 100° C. As an alkaline substance for forming the alkaline aqueous solution, there may be employed sodium carbonate, potassium carbonate, sodium hydroxide, potassium hydroxide or the like. The extent of alkalinity of the alkaline aqueous solution may be pH 11.5 or higher, preferably pH 12 or higher.

The treatment of the silk substance with the alkaline aqueous solution may be carried out by immersing the silk substance in the alkaline aqueous solution.

The period of time (treatment time) during which the silk substance is kept in contact with the alkaline aqueous solution is a period of time sufficiently long to cause the strength of the silk substance, produced by sericulture or wild silkworms, to deteriorate to such an extent that the silk substance can be pulverized into finely divided powder. For silk threads, for example, they are left in contact with the alkaline aqueous solution until their tensile strength becomes approximately 0.05 g/d or less. Generally, the treatment time may be in the range of from 1 to 4 hours; however, an additional 2 or 3 hours or longer are required when the raw silk thread is large or when attachment of siren can be recognized thereon or when a silk substance such as wild silk thread is difficult to weaken. The specific period of time required for allowing the silk substance to be in contact with the alkaline aqueous solution, however, can be determined readily by a simple preliminary experiment for investigating the relationship between the readiness of pulverizing the silk substance with its strength reduced by the alkali treatment and the period of time during which the silk substance remains in contact with the alkaline aqueous solution.

The silk substance treated with the alkaline aqueous solution is then subjected to, after separation from the alkaline aqueous solution, washing to remove the adhering alkaline substance, followed by drying.

Then, the silk substance is pulverized into finely divided powder in a manner as will be described hereinafter. Although the pulverization of the silk substance into finely divided powder can be conducted by a general pulverization technique, it is preferred to divide it into fine powder by a two-step process in which the first step comprises dividing the silk substance into a coarse powder and the second step comprises further dividing it into a fine powder. The pulverization of the silk substance into coarsely divided powder may be effected so as to yield a coarsely divided powder having an average particle size ranging from approximately 15 to 30 microns, and the pulverization thereof into finely divided powder is preferably effected so as to yield finely divided powder having an average particle size ranging approximately from 3 to 6 microns.

When the silk substance is to be treated with the alkaline aqueous solution in accordance with the process of the present invention, it is preferred that the silk substance is placed in a bag made of a cloth material having a fine reticulated structure and that the bag be immersed in the alkaline aqueous solution. In such a treatment, components dissolved from the silk substance into the alkaline aqueous solution and very small silk particles are readily removed from the bag by allowing them to pass through the fine gaps in the cloth material forming the bag. More specifically, the components of the silk substance and the fine silk substances can be removed from the bag, for example, by shaking the bag in the alkaline aqueous solution by plural up and down or right-and left movements, by dipping the bag into the alkaline aqueous solution and then pulling it out of the solution, or the like.

As the cloth material constituting the bag, there may be used a woven or non-woven cloth made of alkali-resistant fibers. The alkali-resist fibers may be cotton fibers, synthetic resin fibers and so on. The dimension of the fine gaps may appropriately be determined in accordance with the dimension of the silk substance to be removed and is generally set to be small enough to allow only the fine silk substances having a size of 1 micron or smaller to pass therethrough into the alkaline aqueous solution.

The treatment of the silk substances in the bag in the manner as described above offers the advantage that the silk substances can be washed with water after treatment while kept in the bag. By subjecting the silk substances to treatment with the alkaline aqueous solution and after-treatment using the bag, a further advantage is obtained in that the silk substances so treated can be collected with high efficiency.

The present invention provides a highly efficient and industrially advantageous production of fine powder of silk fibroin from the silk substances. The fine powder of silk fibroin produced by the present invention is in a crystalline state and is superior to silk thread in moisture diffusion and moisture permeability.

The method according to the present invention is simple in operation because it does not require dissolving the silk substances thoroughly. Further, the fine powder of silk fibroin produced by the present invention is superior in crystalline properties and as high in quality as silk thread because non-crystalline portions of the silk substances are removed upon treatment with the alkaline aqueous solution. Therefore, the method according to the present invention is superior as a process for preparing crystalline fine powder of silk fibroin on an industrial scale.

EXAMPLES

The present invention will be described in more detail by way of the examples which follow.

Example 1

Using raw silk yarn of approximately 30 d (deniers) as a sample, 1 part by weight of the raw silk yarn was immersed in an alkaline aqueous solution consisting of 1 part by weight of sodium carbonate and 30 parts by weight of water and then boiled. In this treatment, the sample raw silk yarn lost weight as time went by and the weight of the silk yarn was reduced by approximately 10% by the treatment at 40 minutes and by approximately 16% by the treatment at 1 hour.

Further, in the previous treatment, the tensile strength of the raw silk yarn deteriorated as time went by and was reduced to approximately 0.04 g/d by the treatment for 1 hour.

The tensile strength of the raw silk yarn in this case was measured with a "Tensilon Model UTM-II".

The raw silk yarn treated in the manner as described hereinabove was then washed with water and subjected to dewatering four times in order to remove alkali, followed by drying at room temperature.

Then, the dried silk yarn was pulverized into a coarsely divided powder having an average particle size of approximately 20 microns and then into a finely divided powder. In this case, the pulverization into coarsely divided powder was conducted with a conventional mill ("Sample Mill", manufactured by Fuji Denki Kogyo K.K.) and the pulverization into finely divided powder was conducted with a fine mill ("Current Jet", manufactured by Nisshin Engineering Co., Ltd.).

It was observed that particle sizes of the fine powder of the raw silk yarn pulverized in the manner as described hereinabove (fine powder of silk fibroin) were distributed in a range of from 1 to 20 microns and their average particle size was approximately 5 microns.

The fine powder of the silk fibroin was then measured by a polarization microscope and it was found to have a birefringence in the range of from $4.0 \times 10^{-3}$ to $5.0 \times 10^{-3}$. This birefringence is substantially equal to that of silk yarn fibroin having a birefringence of $5.2 \times 10^{-3}$. Therefore, it can be concluded that the orientation of fibroin molecules in the finely powdery form is equal to that of the silk yarn fibroin. Further, this conclusion is supported by a X-ray diffraction photograph of the fine powder of the silk fibroin which showed a beta (b) type that was equal to that of silk yarn.

Furthermore, as a result of the thermal observation of the finely divided powder of the silk fibroin by a DSC instrument, no additional exothermic peak due to crystallization was recognized in the DSC curve for the fine powder of the silk fibroin and it was thus confirmed that the fine powder had a crystallinity as high as silk yarn fibroin. In addition, it was found from the hygroscopic and moisture diffusion curves that the fine powder of the silk fibroin had a moisture content about 1% lower than silk yarn and it was confirmed that it had substantially the same hygroscopic and moisture diffusion properties as the silk yarn.

From the foregoing observations it was concluded that the fine powder of the silk fibroin according to the present invention had the same configuration and functions as the silk yarn.

As described hereinabove, the fine powder of the silk fibroin was produced from raw silk yarn at a yield of approximately 70% by the treatment with alkali for about 1 hour.

Example 2

The procedures of Example 1 were followed in substantially the same manner with the exception that the raw silk yarn was placed in a bag and subjected to treatment with alkali and washing with water. The bag employed was a bag made from cotton cloth woven with each of warp and weft having a yarn number count of 50, a warp density of 25 threads per cm, a weft density of 20 threads per cm, a thickness of 0.25 cm and a weight of 120 grams per meter. By using this bag, substances dissolved during the alkali treatment and superfine powder approximately 1 micron and smaller were removed through the cotton cloth of the bag.

In this example, the raw silk yarn used as a raw material provided fine powder of silk fibroin at a yield as high as 70% to 60% by continuing the alkali treatment for about 2 to 3 hours.

Example 3

The procedures of Example 1 were followed in substantially the same manner with the exception that silk cloth was employed in place of the raw silk yarn. This example provided fine powder of silk fibroin at a yield as high as 75% by continuing the alkali treatment for 1 hour.

What is claimed is:

1. A process for the preparation of a fine powder of silk fibroin, comprising:
   contacting a silk substance containing crystalline fibroin with an alkaline aqueous solution at a temperature of 95° C. or higher, while maintaining the crystallinity of the silk fibroin in the silk substance, to reduce the tensile strength of said silk substance;
   dealkalinizing the resulting silk substance;
   drying the dealkalinized silk substance; and
   finely pulverizing the resulting dried silk substance to form the fine powder of silk fibroin having a crystallinity as high as the crystallinity of the fibroin in the silk substance used in said contacting and having an average particle size in the range of 3–6 μm.

2. A process as claimed in claim 1, wherein said contacting of said silk substance with said alkaline aqueous solution is carried out by placing said silk substance in a bag made of a cloth-like material having reticulate fine gaps and immersing said silk substance-containing bag in said alkaline aqueous solution to separate silk particles of a size smaller than said fine gaps and components dissolved from silk substance from the silk fibroin powder.

3. A process as claimed in claim 2, wherein said fine gaps have a size of 1 μm or less.

4. A process as claimed in claim 1, wherein said pulverization of said dried silk substance is carried out by first coarsely grinding said dried silk substance into an average particle size ranging from 15 to 30 μm, followed by fine grinding into an average particle size ranging from 3 to 6 μm.

5. A process as claimed in claim 2, wherein said pulverization of said dried silk substance is carried out by first coarsely grinding said dried silk substance into an average particle size ranging from 15 to 30 μm, followed by fine grinding into an average particle size ranging from 3 to 6 μm.

6. A process as claimed in claim 3, wherein said pulverization of said dried silk substance is carried out by first coarsely grinding said dried silk substance into an average particle size ranging from 15 to 30 μm, followed by fine grinding into an average particle size ranging from 3 to 6 μm.

7. A process as claimed in claim 1 wherein said alkaline aqueous solution is an aqueous solution of an alkali metal compound and has a pH of at least 11.5.

8. A process as claimed in claim 7 wherein said alkaline aqueous solution has a pH of at least 12.0.

9. A process as claimed in claim 1 wherein said alkaline aqueous solution has a pH of at least 11.5.

10. A process as claimed in claim 1 wherein said alkaline aqueous solution has a pH of at least 12.0.

* * * * *

UNITED STATES PATENT AND TRADEMARK OFFICE
CERTIFICATE OF CORRECTION

PATENT NO.    : 5,853,764
DATED         : December 29, 1998
INVENTOR(S)   : Kozo Tsubouchi It is certified that error appears in the above-identified patent and that said Letters Patent is hereby corrected as shown below:

Delete title page and substitute the attached title page.

Delete specification cols. 1-6 and substitute therefore the specification cols. 1-6 as shown on the attached ages.

This certificate supersedes Certificate of Correction issued September 7, 2004.

Signed and Sealed this

Twenty-third Day of November, 2004

JON W. DUDAS
*Director of the United States Patent and Trademark Office*

United States Patent [19]
Tsubouchi

[11] Patent Number: 5,853,764
[45] Date of Patent: Dec. 29, 1998

[54] PROCESS FOR PREPARING FINE POWDER OF SILK FIBROIN

[75] Inventor: Kozo Tsubouchi, Ibaraki-ken, Japan

[73] Assignee: National Institute of Sericultural and Entomological Science, Ministry of Agriculture, Forestry and Fisheries, Director General, Japan

[21] Appl. No.: 08/702,451

[22] PCT Filed: Jan. 26, 1996

[86] PCT No.: PCT/JP96/00154

§ 371 Date: Sep. 26, 1996

§ 102(e) Date: Sep. 26, 1996

[87] PCT Pub. No.: WO96/23020

PCT Pub. Date: Aug. 1, 1996

[30] Foreign Application Priority Data

Jan. 27, 1995 [JP] Japan ................... 7-031417

[51] Int. Cl.$^6$ ............... A61K 7/021; A61K 7/035; A61K 9/50; D06M 11/00
[52] U.S. Cl. ............... 424/499; 424/63; 424/69; 8/128.1
[58] Field of Search ............... 260/123.7; 424/63, 424/69, 499; 8/128.1

[56] References Cited

U.S. PATENT DOCUMENTS

| 4,233,211 | 11/1980 | Ohtomo | 260/123.7 |
| 4,233,212 | 11/1980 | Otoi | 260/123.7 |

FOREIGN PATENT DOCUMENTS

| 5845232 | 3/1983 | Japan |
| 4300369 | 10/1992 | Japan |
| 4337331 | 11/1992 | Japan |

Primary Examiner—George C. Elliott
Assistant Examiner—Sean McGarry
Attorney, Agent, or Firm—Lorusso & Loud

[57] ABSTRACT

A process is provided for preparing a crystalline fine powder of silk fibroin from a silk substance in an advantageous fashion. The process for the preparation of fine powder of the silk fibroin includes heating the silk substance in an alkaline aqueous solution at a temperature of 95° C. or higher in order to reduce the strength of the silk substance, the resulting silk substance is then washed and dried, and the dry silk substance is pulverized into a finely divided powder.

10 Claims, No Drawings

PROCESS FOR PREPARING FINE POWDER OF SILK FIBROIN

TECHNICAL FIELD

The present invention relates to a process for preparing fine powder of silk fibroin from a silk substance.

BACKGROUND ART

Fine powder of silk fibroin is useful as an additive to food products, beverages and cosmetic products.

One known process for preparing fine powder of silk fibroin includes dissolving a silk substance in an aqueous solution containing a neutral salt, removing the neutral salt from the solution to yield an aqueous fibroin solution, adding a precipitating agent to the resulting aqueous solution to cause the silk fibroin to precipitate therein, and separating the precipitate from the solution and drying the precipitate or lyophilizing the aqueous solution, thereby obtaining a fine powder of silk fibroin.

This process, however, cannot be said to be satisfactory from the point of view of industrial application because it requires the silk substance to be dissolved in water to form an aqueous solution.

On the other hand, a silk substance cannot be pulverized into a finely divided crystalline powder with high efficiency by mechanically dividing the silk substance directly into fine powder because the silk substance is so high in mechanical strength that it is very hard to divide it into fine powder.

It is an object of the present invention to provide a process for preparing a fine powder of crystalline silk fibroin from a silk substance, which process offers certain industrial advantages.

DISCLOSURE OF INVENTION

The present invention provides a process for the preparation of a fine powder of silk fibroin wherein a silk substance is contacted with an alkaline aqueous solution at a temperature of 95° C. or higher to reduce the strength of said silk substance. The resulting silk substance is then subjected dealkalinization and drying, and the resulting dried silk substance is thereafter finely pulverized.

The silk substance to be used for the present invention may include, for example, cocoons, cocoon thread, silk yarn, silk cloth and waste therefrom.

The process according to the present invention is preferably carried out by first treating a silk substance by bringing it into contact with an alkaline aqueous solution at a temperature of 95° C. or higher, preferably approximately 100° C. As an alkaline substance for forming the alkaline aqueous solution, there may be employed sodium carbonate, potassium carbonate, sodium hydroxide, potassium hydroxide or the like. The extent of alkalinity of the alkaline aqueous solution may be pH 11.5 or higher, preferably pH 12 or higher.

The treatment of the silk substance with the alkaline aqueous solution may be carried out by immersing the silk substance in the alkaline aqueous solution.

The period of time (treatment time) during which the silk substance is kept in contact with the alkaline aqueous solution is a period of time sufficiently long to cause the strength of the silk substance, produced by sericulture or wild silkworms, to deteriorate to such an extent that the silk substance can be pulverized into finely divided powder. For silk threads, for example, they are left in contact with the alkaline aqueous solution until their tensile strength becomes approximately 0.05 g/d or less. Generally, the treatment time may be in the range of from 1 to 4 hours; however, an additional 2 or 3 hours or longer are required when the raw silk thread is large or when attachment of siren can be recognized thereon or when a silk substance such as wild silk thread is difficult to weaken. The specific period of time required for allowing the silk substance to be in contact with the alkaline aqueous solution, however, can be determined readily by a simple preliminary experiment for investigating the relationship between the readiness of pulverizing the silk substance with its strength reduced by the alkali treatment and the period of time during which the silk substance remains in contact with the alkaline aqueous solution.

The silk substance treated with the alkaline aqueous solution is then subjected to, after separation from the alkaline aqueous solution, washing to remove the adhering alkaline substance, followed by drying.

Then, the silk substance is pulverized into finely divided powder in a manner as will be described hereinafter. Although the pulverization of the silk substance into finely divided powder can be conducted by a general pulverization technique, it is preferred to divide it into fine powder by a two-step process in which the first step comprises dividing the silk substance into a coarse powder and the second step comprises further dividing it into a fine powder. The pulverization of the silk substance into coarsely divided powder may be effected so as to yield a coarsely divided powder having an average particle size ranging from approximately 15 to 30 microns, and the pulverization thereof into finely divided powder is preferably effected so as to yield finely divided powder having an average particle size ranging approximately from 3 to 6 microns.

When the silk substance is to be treated with the alkaline aqueous solution in accordance with the process of the present invention, it is preferred that the silk substance is placed in a bag made of a cloth material having a fine reticulated structure and that the bag be immersed in the alkaline aqueous solution. In such a treatment, components dissolved from the silk substance into the alkaline aqueous solution and very small silk particles are readily removed from the bag by allowing them to pass through the fine gaps in the cloth material forming the bag. More specifically, the components of the silk substance and the fine silk substances can be removed from the bag, for example, by shaking the bag in the alkaline aqueous solution by plural up and down or right-and left movements, by dipping the bag into the alkaline aqueous solution and then pulling it out of the solution, or the like.

As the cloth material constituting the bag, there may be used a woven or non-woven cloth made of alkali-resistant fibers. The alkali-resist fibers may be cotton fibers, synthetic resin fibers and so on. The dimension of the fine gaps may appropriately be determined in accordance with the dimension of the silk substance to be removed and is generally set to be small enough to allow only the fine silk substances having a size of 1 micron or smaller to pass therethrough into the alkaline aqueous solution.

The treatment of the silk substances in the bag in the manner as described above offers the advantage that the silk substances can be washed with water after treatment while kept in the bag. By subjecting the silk substances to treatment with the alkaline aqueous solution and after-treatment using the bag, a further advantage is obtained in that the silk substances so treated can be collected with high efficiency.

The present invention provides a highly efficient and industrially advantageous production of fine powder of silk fibroin from the silk substances. The fine powder of silk fibroin produced by the present invention is in a crystalline state and is superior to silk thread in moisture diffusion and moisture permeability.

The method according to the present invention is simple in operation because it does not require dissolving the silk substances thoroughly. Further, the fine powder of silk fibroin produced by the present invention is superior in crystalline properties and as high in quality as silk thread because non-crystalline portions of the silk substances are removed upon treatment with the alkaline aqueous solution. Therefore, the method according to the present invention is superior as a process for preparing crystalline fine powder of silk fibroin on an industrial scale.

EXAMPLES

The present invention will be described in more detail by way of the examples which follow.

Example 1

Using raw silk yarn of approximately 30 d (deniers) as a sample, 1 part by weight of the raw silk yarn was immersed in an alkaline aqueous solution consisting of 1 part by weight of sodium carbonate and 30 parts by weight of water and then boiled. In this treatment, the sample raw silk yarn lost weight as time went by and the weight of the silk yarn was reduced by approximately 10% by the treatment at 40 minutes and by approximately 16% by the treatment at 1 hour.

Further, in the previous treatment, the tensile strength of the raw silk yarn deteriorated as time went by and was reduced to approximately 0.04 g/d by the treatment for 1 hour.

The tensile strength of the raw silk yarn in this case was measured with a "Tensilon Model UTM-II".

The raw silk yarn treated in the manner as described hereinabove was then washed with water and subjected to dewatering four times in order to remove alkali, followed by drying at room temperature.

Then, the dried silk yarn was pulverized into a coarsely divided powder having an average particle size of approximately 20 microns and then into a finely divided powder. In this case, the pulverization into coarsely divided powder was conducted with a conventional mill ("Sample Mill", manufactured by Fuji Denki Kogyo K.K.) and the pulverization into finely divided powder was conducted with a fine mill ("Current Jet", manufactured by Nisshin Engineering Co., Ltd.).

It was observed that particle sizes of the fine powder of the raw silk yarn pulverized in the manner as described hereinabove (fine powder of silk fibroin) were distributed in a range of from 1 to 20 microns and their average particle size was approximately 5 microns.

The fine powder of the silk fibroin was then measured by a polarization microscope and it was found to have a birefringence in the range of from $4.0 \times 10^{-3}$ to $5.0 \times 10^{-3}$. This birefringence is substantially equal to that of silk yarn fibroin having a birefringence of $5.2 \times 10^{-3}$. Therefore, it can be concluded that the orientation of fibroin molecules in the finely powdery form is equal to that of the silk yarn fibroin. Further, this conclusion is supported by a X-ray diffraction photograph of the fine powder of the silk fibroin which showed a beta (b) type that was equal to that of silk yarn.

Furthermore, as a result of the thermal observation of the finely divided powder of the silk fibroin by a DSC instrument, no additional exothermic peak due to crystallization was recognized in the DSC curve for the fine powder of the silk fibroin and it was thus confirmed that the fine powder had a crystallinity as high as silk yarn fibroin. In addition, it was found from the hygroscopic and moisture diffusion curves that the fine powder of the silk fibroin had a moisture content about 1% lower than silk yarn and it was confirmed that it had substantially the same hygroscopic and moisture diffusion properties as the silk yarn.

From the foregoing observations it was concluded that the fine powder of the silk fibroin according to the present invention had the same configuration and functions as the silk yarn.

As described hereinabove, the fine powder of the silk fibroin was produced from raw silk yarn at a yield of approximately 70% by the treatment with alkali for about 1 hour.

Example 2

The procedures of Example 1 were followed in substantially the same manner with the exception that the raw silk yarn was placed in a bag and subjected to treatment with alkali and washing with water. The bag employed was a bag made from cotton cloth woven with each of warp and weft having a yarn number count of 50, a warp density of 25 threads per cm, a weft density of 20 threads per cm, a thickness of 0.25 cm and a weight of 120 grams per meter. By using this bag, substances dissolved during the alkali treatment and superfine powder approximately 1 micron and smaller were removed through the cotton cloth of the bag.

In this example, the raw silk yarn used as a raw material provided fine powder of silk fibroin at a yield as high as 70% to 60% by continuing the alkali treatment for about 2 to 3 hours.

Example 3

The procedures of Example 1 were followed in substantially the same manner with the exception that silk cloth was employed in place of the raw silk yarn. This example provided fine powder of silk fibroin at a yield as high as 75% by continuing the alkali treatment for 1 hour.

What is claimed is:

1. A process for the preparation of a fine powder of silk fibroin, comprising:

contacting a silk substance containing crystalline fibroin with an alkaline aqueous solution at a temperature of 95° C. or higher, while maintaining the crystallinity of the silk fibroin in the silk substance, to reduce the tensile strength of said silk substance;

dealkalinizing the resulting silk substance;

drying the dealkalinized silk substance; and finely pulverizing the resulting dried silk substance to form the fine powder of silk fibroin having a crystallinity as high as the crystallinity of the fibroin in the silk substance used in said contacting and having an average particle size in the range of 3–6 μm.

2. A process as claimed in claim 1, wherein said contacting of said silk substance with said alkaline aqueous solution is carried out by placing said silk substance in a bag made of a cloth-like material having reticulate fine gaps and immersing said silk substance-containing bag in said alkaline aqueous solution to separate silk particles of a size smaller than said fine gaps and components dissolved from silk substance from the silk fibroin powder.

3. A process as claimed in claim 2, wherein said fine gaps have a size of 1 μm or less.

4. A process as claimed in claim 1, wherein said pulverization of said dried silk substance is carried out by first coarsely grinding said dried silk substance into an average particle size ranging from 15 to 30 μm, followed by fine grinding into an average particle size ranging from 3 to 6 μm.

5. A process as claimed in claim 2, wherein said pulverization of said dried silk substance is carried out by first coarsely grinding said dried silk substance into an average particle size ranging from 15 to 30 μm, followed by fine grinding into an average particle size ranging from 3 to 6 μm.

6. A process as claimed in claim 3, wherein said pulverization of said dried silk substance is carried out by first coarsely grinding said dried silk substance into an average particle size ranging from 15 to 30 μm, followed by fine grinding into an average particle size ranging from 3 to 6 μm.

7. A process as claimed in claim 1 wherein said alkaline aqueous solution is an aqueous solution of an alkali metal compound and has a pH of at least 11.5.

8. A process as claimed in claim 7 wherein said alkaline aqueous solution has a pH of at least 12.0.

9. A process as claimed in claim 1 wherein said alkaline aqueous solution has a pH of at least 11.5.

10. A process as claimed in claim 1 wherein said alkaline aqueous solution has a pH of at least 12.0.

* * * * *